United States Patent [19]

Sluis

[11] 3,750,800

[45] Aug. 7, 1973

[54] ARTICLE ORIENTING MACHINE

[76] Inventor: Pieter A. Sluis, 600 Cotton St., Menlo Park, Calif. 94025

[22] Filed: July 12, 1971

[21] Appl. No.: 161,535

[52] U.S. Cl............................ 198/33 AA, 198/165
[51] Int. Cl............................................. B65g 47/24
[58] Field of Search..................... 198/33 AA, 165; 221/171; 209/102

[56] References Cited
UNITED STATES PATENTS

| 2,252,498 | 8/1941 | Flaws | 198/33 AA |
| 3,326,350 | 6/1967 | Cromer | 198/33 AA |

FOREIGN PATENTS OR APPLICATIONS

| 45,822 | 8/1967 | Germany | 209/102 |

Primary Examiner—Edward A. Sroka
Attorney—Thomas E. Schatzel

[57] ABSTRACT

A machine for orienting tapered objects at a receiving station; carrier means for transporting said objects from said receiving station in proper oriented position to a discharge station; said receiving station including a first pair of laterally opposite surfaces and a second pair of laterally opposite surfaces, said first and second surfaces being vertically displaced relative to one another, the lateral spacing between said first pair of surfaces being greater than the lateral spacing between said second pair of surfaces, and the first pair of surfaces being movable relative to the second pair of surfaces whereby said object may be transported from the receiving station to the discharge station.

3 Claims, 3 Drawing Figures

PATENTED AUG 7 1973

3,750,800

INVENTOR.
PIETER A. SLUIS
BY Thomas Schatzel
ATTORNEY

ARTICLE ORIENTING MACHINE

BACKGROUND OF THE INVENTION

The present invention relates generally to a machine for orienting tapered objects and more particularly to a machine adapted for orienting objects and transporting said objects in oriented position.

There are various applications, for example in the food processing industry, requiring machines for transporting objects between positions and in which the oriented position of the object is of prime concern. For example, in harvesting and processing okra it is desirable to remove the caps from the pod section of the plant. Accordingly, it is desirable to have an orienting machine adapted to receive the plant after harvesting and to orient the pod segment relative to the cap segment and then transport the plant to a position where the segments may be segmented. Likewise with various other vegetables and tapered objects similar processes are desirable.

Heretofore many of these processes have been performed by human labor which approach is time consuming and uneconomical.

SUMMARY OF THE PRESENT INVENTION

The present invention provides a machine adapted to receive tapered objects, such as okra, orient the object in a desired position and then transport the object to a discharge station. For example, the disposing station may be adapted for removing the cap portions from the pod when utilized with okra. The orienting machine of the present invention includes a receiving station in which the object may be received in either an upright or inverted position and then oriented for transfer. The machine includes a belt means to transport the object from the receiving station to a remotely located discharge station aligned with the travel path of the belt means. At the discharge station the object is discharged from the belt means in the desired oriented position. At the dicharge station the desired process such as segmenting of the cap from the rest of the pod may be performed.

An exemplary embodiment of the present invention may include a receiving station adapted to receive tapered objects in a controlled process. The receiving station is adapted to receive the object from a disposal and to longitudinally orient the small diameter segment of the object relative to the larger diameter segment. The receiving station includes a first pair of lateral surfaces in alignment with the path of disposal of the object and a second pair of laterally spaced surfaces in substantial vertical alignment with the first pair of surfaces. The lateral spacing between the first pair of surfaces exceeds the lateral spacing between the second pair of surfaces. A transporting means in the form of a pair of belts travels adjacent to the first pair of surfaces to frictionally engage the object and transport it away from the receiving station. The direction of travel of the belt is adapted to carry the object from the receiving station to a discharge station. The belt is adapted to carry the object and maintain the object in the oriented position. The receiving station may be adapted such that the spacing between the first pair of lateral surfaces may be adjusted and the spacing between the second pair of lateral surfaces may be adjusted as desired.

DESCRIPTION OF PREFERRED EMBODIMENTS

Figure 1:
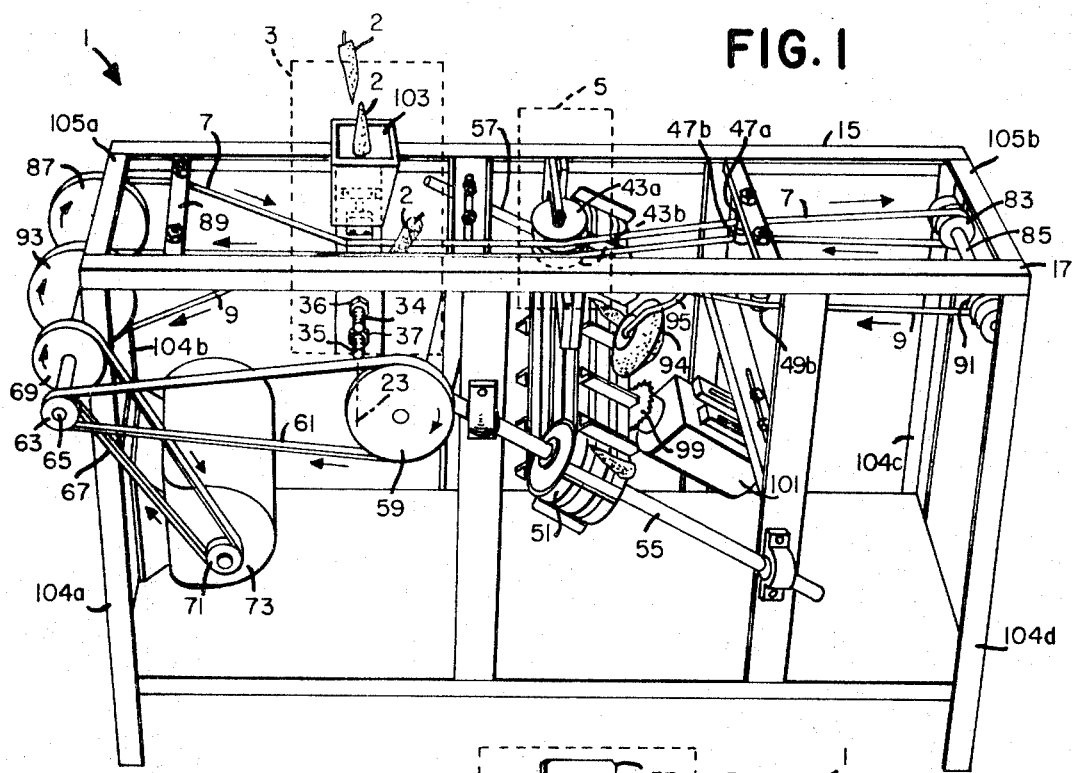
FIG. 1 is a perspective view of an orienting machine incorporating the teachings of the present invention.
Figure 2:
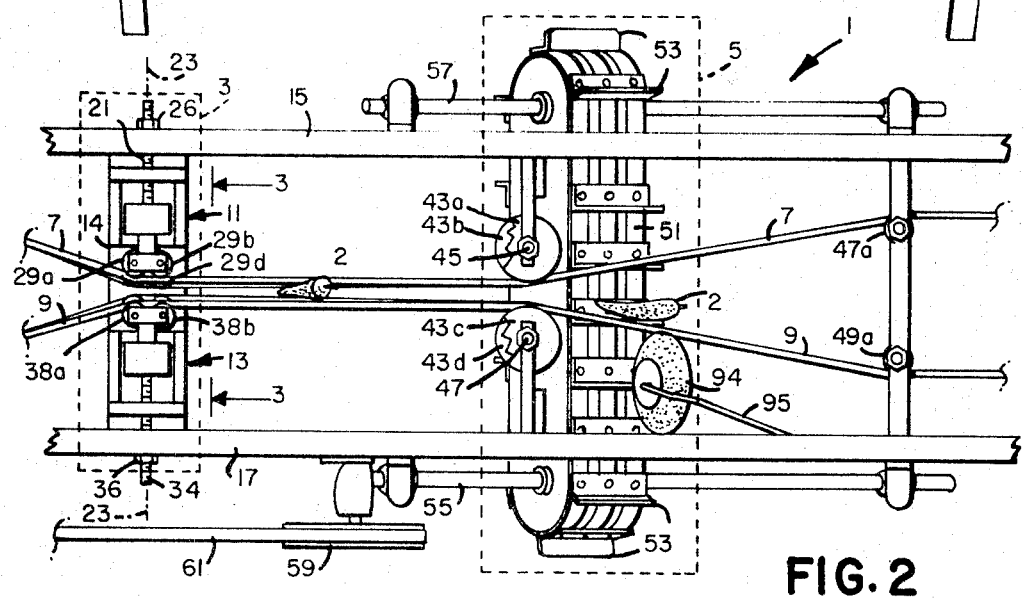
FIG. 2 is a top view of an enlarged segment of the machine of FIG. 1 and illustrating the receiving station and the discharge station.
Figure 3:
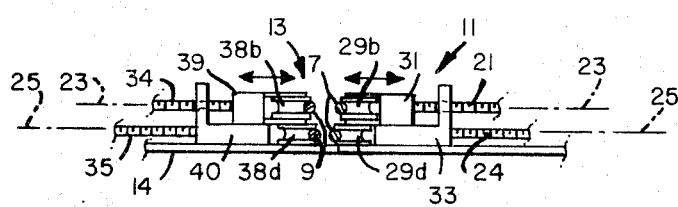
FIG. 3 is an end view of the receiving station taken along the lines 3—3 of FIG. 2.

The drawings of FIGS. 1-3 illustrate an orienting machine of the present invention and referred to by general reference character 1. For illustration purpose, the embodiment is illustrated as utilized for transporting okra to a position for segmenting the cap of the pod. The drawings illustrate various pieces of okra 2. The orienting machine 1 includes a receiving station section as illustrated by the broken line block 3 and a discharge station as illustrated by the broken line block 5. The machine 1 includes a carrier means in the form of a pair of continuous belts 7 and 9 to transport the object from the receiving station 3 to the discharge station 5.

The receiving station 3 includes a pair of adjustable heads referred to by the general reference character 11 and 13 supported by a cross arm 14 extending between a pair of arm braces 15 and 17. The head 11 includes a screw member 21 extending along an axis 23 normal to the travel path of the belts 7 and 9 and a screw member 24 extending along an axis 25 parallel to the axis 23. The screw 21 is engaged by a nut 26 about the outer surface of the brace 15 and the screw 24 is engaged by a nut (not shown) about the outer surface of the brace 15. The head 11 further includes a set of four guide rollers 29a, 29b, 29c and 29d with the rollers 29c and 29d vertically adjacent to the rollers 29a and 29b. The rollers 29a and 29b are engaged to a support brace 31 secured to the screw 21. The rollers 29c and 29d are engaged to an angle brace 33 such that the relative position between the braces 31 and 33 and the relative position between the rollers 29a and 29b with the rollers 29c and 29d may be adjusted. The screw 24 may be adjusted to adjust the position of all rollers 29a, 29b, 29c and 29d and the screw 21 may be adjusted to adjust the position of the rollers 29a and 29b to the rollers 29c and 29d. The head 13 includes a screw member 34 extending along the axis 23 and a screw member 35 extending along the axis 25. The screw 34 is engaged by a nut 36 about the outer surface of the brace 17 and the screw 35 is engaged by a nut 37 about the outer surface of the brace 17. The head 13 further includes a set of four guide rollers 38a, 38b, 38c and 38d with the rollers 38c and 38d being vertically adjacent to the rollers 38a and 38b. The rollers 38a and 38b are engaged to a support brace 39 secured to the screw 34. The rollers 38c and 38d are engaged to an angle brace 40 such that the relative position between the braces 39 and 40 and the relative position between the rollers 38a and 38b with the rollers 38c and 38d may be adjusted. The screw 35 may be adjusted to adjust the position of all rollers 38a, 38b, 38c and 38d and the screw 35 may be adjusted to adjust the position of the rollers 38c and 38d to the rollers 38a and 38b. The rollers 29a, 29b, 29c and 29d and the rollers 38a, 38b, 38c and 38d create low friction members for engaging the belts 7 and 9 at the receiving station 3.

The continuous belt 7 is positioned such that the top ride of the belt is engaged by the rollers 29a and 29b and moves in a direction from the receiving station 3 towards the discharge station 5. The bottom run of the belt 7 engages the rollers 29c and 29d with the belt 5 moving from the discharge station 5 towards the receiving station 3. The continuous belt 9 is such that the top run of the belt engages the rollers 38a and 38b and moves in a direction from the receiving station 3 towards the discharge station while the bottom run of the belt 9 engages the rollers 38c and 38c and moves from the discharge station 5 towards the receiving station 3. Accordingly, the rollers 29a and 29b in combination with the belt 7 forms a first surface and the belt 9 in combination with the rollers 38a and 38b form a second surface with the first and second surfaces laterally positioned relative to one another. At the same time the belt 7 in combination with the rollers 29c and 29d form a third surface which is laterally spaced from a fourth surface formed by the rollers 38c and 38d in combination with the bottom run of the belt 9.

Accordingly, by depositing an object having a tapered surface intermediate the first and second surfaces, the object tends to engage the first and second lateral surfaces and the apex tends to orient with the third and fourth surfaces. Accordingly, as the object is disposed to the receiving station, upper runs of the belts 7 and 9 serve as a pair of transport belts and; tend to draw the object towards the discharge station while the lower run of the belts 7 and 9 serve as a pair of orienting belts and tend to draw the object away from the receiving station 3. Due to gravitational force and the frictional engagement of the belts with the object, the object tends to assume a longitudinal position and is drawn towards the discharge station.

The discharge station 5 includes a set of four guide pulleys 43a, 43b, 43c and 43d with the pulleys 43a and 43b rotatable about a common axis 45 and the pulleys 43c and 43d rotatable about a common axis 47. The guide pulleys 43a and 43b are laterally spaced from the pulleys 43c and 43d respectively by an equal amount such that the transported object tends to assume a substantially horizontal position as it approaches the discharge station. The travel path of the belts 7 and 9 each further include another pair of guide pulleys 47a and 47b and a pair of guide pulleys 49a and 49b positioned about the opposite side of the discharge station 5. The lateral spacing between the two pulleys 47a and 47b with the pulleys 49a and 49b exceed the lateral spacing between the pulleys 43a and 43b with the pulleys 43c and 43d such that the travel path tends to take the shape of a "Y" permitting discharge of the object. Intermediate the pulleys 47 and 49 and the pulleys 43a, 43b, 43c and 43d is a conveyer belt 51 positioned beneath the travel path of the belts 7 and 9 at the discharge station 5. Accordingly, as the object is carried past the pulleys 43a, 43b, 43c and 43d the object tends to drop onto the conveyer belt 51 with the larger cross section of the object directed towards the pulleys 47a and 47b and 49a and 49b. The conveyer belt 51 has a number of individual cleats 53 positioned thereon. The belt 51 is driven in a rotational path about a first drive shaft 55 and about an idler shaft 57. The shafts 55 and 57 are laterally spaced in alignment on opposite sides of the braces 15 and 17. The shaft 55 is driven by a pulley 59 engaged to a belt 61 and in turn engaged to a pulley 63. The pulley 63 is secured to a shaft 65 in turn engaged by a pulley 69 which is driven by a belt 67 engaged to a pulley 71 secured to a drive motor 73. The belt 7 is secured to an end pulley 83 secured on an idler shaft 85. The belt 7 is further engaged to a drive pulley 87 secured to the drive shaft 65 and adapted to drive the belt 7 in a clockwise direction. Intermediate the drive pulley 87 and the receiving station 3 the belt 7 is guided past a pair of guide pulleys (not shown) secured to a cross member 89. The belt 9 is guided over a guide pulley 91 secured to the shaft 85 and is driven by a pulley 93 secured to the drive shaft 65. The belt 9 is guided past a pair of guide rollers (not shown) mounted on the support member 89.

Above the top surface of the belt 51 is a pliable guide roller 94 secured to an arm 95 in turn secured to the brace 17. Adjacent to the travel path of the conveyor belt 51 is a cutter 99 driven by a motor 101 such that as the object, for example okra is transported past the cutting member 99 the caps of the okra may be segmented from the pod.

The machine 1 as illustrated further carries a funnel-like member 103 secured vertically above the receiving station 3 in alignment with the spacing intermediate the belts 7 and 9. The funnel-like assembly 103 is adapted to receive the tapered objects successively in either an upright or oriented position. The assembly 103 permits said objects to be delivered to the receiving station individually.

The machine 1 includes a plurality of legs 104a, 104b, 104c and 104d engaged to the support braces 15 and 17. A pair of end braces 105a and 105b extend intermediate the support braces 15 and 17 and are engaged to the leg members 104a, 104b, 104c and 104d.

I claim:

1. A machine for receiving, orienting and transporting tapered objects, said machine comprising in combination:

a support frame;

a pair of transport belts supported by said support frame, the transport belts being laterally spaced relative to one another and both movable in the same direction along a longitudinal transport travel path of the support frame, the transport belts being adapted to simultaneously frictionally engage a tapered object to be transported and to support said object within the lateral spacing intermediate the belts with one end of said object projecting above the elevation of the transport belts;

a pair of orienting belts supported by said support frame at an elevation beneath the transport belts, each of the orienting belts being movable parallel to the transport travel path of the transport belts and in the opposite direction of the transport belts;

means for driving the transport belts and the orienting belts along their respective travel paths of the support assembly and in opposite directions relative to one another;

a receiving station means supported by said support frame for receiving said object within the lateral spacing intermediate the transport belts as said object approaches the transport belts from an elevated position above said transport belts, the receiving station being positioned along said travel paths of the transport belts and the orienting belts, the receiving station including at least a first pair of contact surfaces positioned laterally relative to one another and contacting the transport belts to establish a lateral spacing between the transport belts, said lateral spacing between the transport belts at the receiving station being less than the maximum diameter of said object and greater than the minimum diameter of said object, a second pair of contact surfaces positioned laterally relative to one another beneath said first pair of contact surfaces, said second pair of contact surfaces contacting the orienting belts to establish the lateral spacing between the orienting belts, the lateral spacing between the orienting belts at the receiving station being less than the lateral spacing between the transport belts at the receiving station and equal or greater than the minimum diameter of said tapered object to be transported, and the vertical distance between the transport belts and each of the orienting belts at the receiving station being less than the height of said object to be transported to permit each of the orienting belts to frictionally contact said object about said other end of said object;

a discharge station for receiving said object from said transport belts, the discharge station being positioned remote from the receiving station and in alignment with said path of the transport belts; and means for discharging said object from intermediate the transport belts at the discharge station.

2. The machine of claim 1 in which
the receiving station includes adjustment means for adjusting the lateral spacing between said second pair of contact surfaces to adjust the lateral spacing between the orienting belts at the receiving station.

3. The machine of claim 1 in which
the transport belts and the orienting belts are in the form of two endless belts positioned laterally relative to one another, the top run of each of said two endless belts extending intermediate the receiving station and the discharge station to receive and transport said object intermediate the receiving station and the discharge station, and the lower run of each of said endless belts extending intermediate the receiving station and the discharge station beneath the top runs to frictionally engage said object and urge said object in the opposite direction from the direction of top run; and means adjacent the discharge station for increasing the lateral spacing between the transport belts and the orienting belts at the discharge station, said increased lateral spacing at the discharge station exceeding the maximum diameter of said object.

* * * * *